Aug. 25, 1931.  C. G. HALL  1,820,564
KITCHEN ARRANGEMENT
Filed Feb. 3, 1930
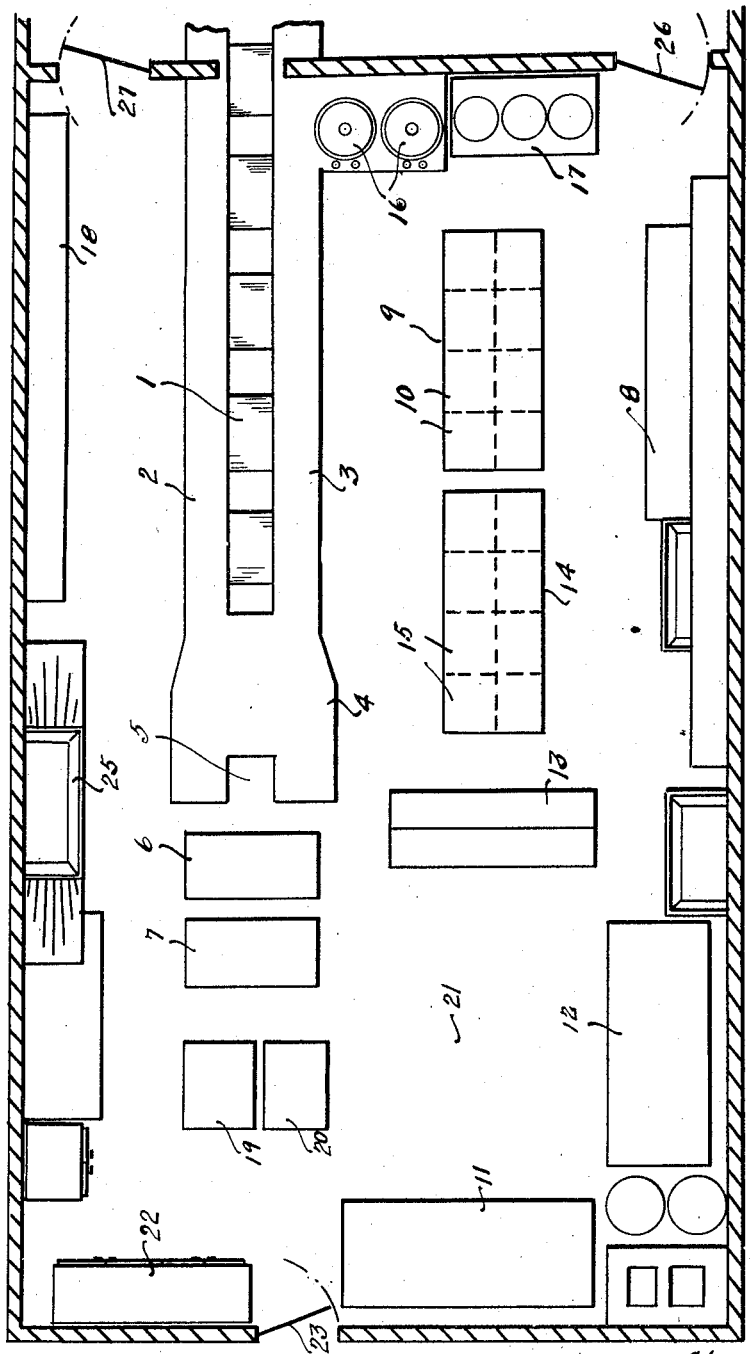
Charles G. Hall
INVENTOR
BY
ATTORNEY Patented Aug. 25, 1931

1,820,564

UNITED STATES PATENT OFFICE

CHARLES G. HALL, OF BOISE, IDAHO, ASSIGNOR TO AUTOMATIC FOOD MACHINERY CORPORATION, OF BOISE, IDAHO

KITCHEN ARRANGEMENT

Application filed February 3, 1930. Serial No. 425,703.

My invention relates to kitchen arrangements for eating places and is primarily adaptable for use where a conveyor system is used in the transfer of food and merchandise from a central kitchen to the point of use.

The invention consists primarily of a kitchen in which is disposed a conveyor for conveying food to the point of distribution and having conveyor belts for returning soiled dishes, linen and eating utensils for reconditioning and for reuse. The food is prepared at convenient locations upon suitable ranges and work tables and is transferred therefrom to the conveyor. The soiled elements are distributed upon an assembly head from where they pass directly into the dish washers and driers and from there they are taken for reuse by the chef. Mixing devices, refrigerators and the like are provided at convenient locations and steam cabinets and refrigerating cabinets are provided for the storing of hot and cold articles of food until placed upon the conveyor for delivery to the dining department. Work benches, wash basins, cooking stoves and ovens are provided at the most convenient locations for use in conjunction with the conveying systems.

The primary object of my invention is to reduce to a minimum the amount of space required in the preparation of foods and the reconditioning of utensils that are normally used in eating establishments.

A further object of my invention consists in providing an arrangement of devices within the kitchen, the object of which is to reduce to a minimum the amount of effort required by chefs and assistants in the preparing, handling and reconditioning of a maximum amount of food within a minimum of space and with a minimum of effort.

A still further object of my new and improved kitchen arrangement consists in providing an arrangement of devices wherein the food may be delivered to the patron in the best possible condition in the most expeditious manner and with a minimum of effort.

A still further object of my invention consists in providing an arrangement wherein the reconditioning of the soiled utensils, dishes and linen may be reduced to a minimum.

With these and incidental objects in view, the invention consists in certain novel features of construction and combination of parts, the essential elements of which are set forth in the appended claims, and a preferred form of embodiment of which is hereinafter shown with reference to the drawing which accompany and form a part of this specification.

In the drawing:

Fig. 1 is a plan view of the kitchen arrangement.

Like reference characters refer to like parts throughout the drawing.

My new and improved kitchen is primarily intended for use in combination with an endless conveyor 1 that is adapted for conveying food from the kitchen to the dining room. The conveyor runs longitudinally of the kitchen and of the dining room with patrons being served by seats adjacent and away from the conveyor as the same passes through the dining room. Conveyor belts 2 and 3 carry dishes, soiled linen, utensils and the like from the dining room and deposit the same upon the conveyor head 4. The sorter of the returned materials stands within the recess 5 and passes the materials, utensils, dishes and the like through a dish washing machine 6 and a dryer 7. A work table 8 is disposed at one side of the room where salads, pastries and the like are passed through a cabinet 9. The cabinet 9 is divided into a plurality of compartments 10 in which trays may be placed. The trays are transferred directly from the refrigerated cabinet 9 upon the endless conveyor 1.

The conveyor is so arranged that the trays will be carried throughout one or more cycles of operation of the transfer belt without being removed therefrom.

The cooking ranges 11 and 12 are preferably disposed at right angles to each other. The hot foods are transferred from the ranges to a work table 13 and from there into a heated cabinet 14. The heated cabinet 14 is divided into a plurality of compartments 15. Trays may be transferred from the table 13 into the heated cabinet 14 and be retransferred from there upon the endless conveyor 1. The coffee urns 16 are disposed in one end of the kitchen and adjacent the endless conveyor and the coffee and other beverages are disposed upon the trays as they pass along the transfer chain. Ice cream and frozen confections are disposed within the cabinet 17 and are transferred directly from the cabinet upon the endless conveyor 1.

Pastries and the like may be maintained in a cabinet 18 disposed along one side of the kitchen and be transferred from there directly upon the endless conveyor. The work table 13, the dish washing and drying machines 6 and 7 and the meat blocks 19 and 20 are disposed around the working space 21 so that the chef and his assistants prepare the food and pass the same over the work table from where the same is passed into the heated cabinet or upon the conveyor. A meat refrigerator 22 is disposed adjacent the door 23 and the meat is passed directly over the meat blocks and from there to the cook or chef. Where the amount of dishes and utensils are not sufficiently large to justify the passing of the same through the dish washing machine and drier the same may be passed directly from the conveyor head 4 into the basin 25 and be retransferred from there as required.

Admittance may be had at either side of the kitchen through the doors 26 and 27.

The arrangement herein outlined provides for the efficient handling of foods in a relatively narrow kitchen and permits the handling of a large volume of the same with a minimum of labor and effort.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a kitchen of the class described, the combination of an endless conveyor running longitudinally of the kitchen, ranges arranged at right angles to each other, a work table accessible to each of the ranges and disposed between the ranges and the conveyor, and a chilled cabinet and a heated cabinet disposed between the work table and the conveyor and arranged parallelly to the conveyor.

2. In a kitchen of the class described, the combination of a conveyor emanating from the kitchen and adapted for the conveying of food from the kitchen, ranges arranged at one end of the kitchen and spaced apart from the end of the conveyor, a distributing head disposed at the kitchen end of the conveyor, a plurality of cabinets arranged parallelly to the conveyor and spaced therefrom sufficiently to facilitate a worker therebetween, a work table disposed between the ranges and the cabinets and a coffee station and an ice cream station arranged in close proximity to one side of the conveyor.

3. In a kitchen of the class described, the combination of a conveyor running from the kitchen, a distributor head disposed adjacent the kitchen end of the conveyor, a plurality of ranges arranged at one side of the kitchen and at the rear of the conveyor head, a washing and drying machine disposed at the kitchen end of the conveyor head, a pastry and salad cabinet disposed along one side wall of the kitchen, a plurality of compartmented cabinets disposed in spaced relation with the conveyor and the pastry and salad cabinets and in spaced relation with each and a work table disposed between the ranges and the cabinets.

4. In a kitchen of the class described, the combination of a conveyor running longitudinally of and in spaced relation with the side walls of one end of the kitchen, a sorting head disposed at the kitchen end of the conveyor, reconditioning machines disposed adjacent the end of the sorting table, compartmented cabinets disposed adjacent one side of the conveyor, pastry and salad cabinets disposed adjacent one side of the cabinets, ranges disposed at one end of the kitchen, a work table disposed between the cabinets and the ranges and a coffee stand and an ice cream cabinet disposed adjacent each other and the conveyor.

CHARLES G. HALL.